United States Patent
Tanaka et al.

(10) Patent No.: US 7,620,257 B2
(45) Date of Patent: Nov. 17, 2009

(54) IMAGE PROCESSOR

(75) Inventors: Satoshi Tanaka, Kyoto (JP); Seiji Hashimoto, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 736 days.

(21) Appl. No.: 11/384,541

(22) Filed: Mar. 21, 2006

(65) Prior Publication Data

US 2006/0236200 A1    Oct. 19, 2006

(30) Foreign Application Priority Data

Mar. 30, 2005  (JP) .............................. 2005-099513

(51) Int. Cl.
G06K 9/00 (2006.01)
G06K 9/36 (2006.01)
G06K 9/46 (2006.01)

(52) U.S. Cl. ........................ 382/240; 382/218; 382/100

(58) Field of Classification Search ................ 382/100, 382/173, 218–219, 232, 233, 236, 239, 240, 382/248; 375/240.11, 240.17, 240.19, 240.24, 375/240.25; 714/758; 704/500; 341/143
See application file for complete search history.

(56) References Cited

U.S. PATENT DOCUMENTS

| | | | | |
|---|---|---|---|---|
| 5,883,978 A | * | 3/1999 | Ono ............................ | 382/248 |
| 6,144,769 A | * | 11/2000 | Sato et al. .................... | 382/236 |
| 6,343,100 B1 | * | 1/2002 | Fujiwara et al. ......... | 375/240.17 |
| 6,453,073 B2 | * | 9/2002 | Johnson ...................... | 382/239 |
| 6,496,539 B2 | * | 12/2002 | Watanabe et al. ....... | 375/240.16 |
| 6,917,712 B2 | * | 7/2005 | Tsushima et al. ........... | 382/232 |
| 6,941,022 B2 | * | 9/2005 | Shibata et al. .............. | 382/239 |
| 6,980,143 B2 | * | 12/2005 | Linzmeier et al. ........... | 341/143 |
| 7,187,780 B2 | * | 3/2007 | Tian et al. .................... | 382/100 |
| 7,246,065 B2 | * | 7/2007 | Tanaka et al. ............... | 704/500 |
| 2005/0265613 A1 | * | 12/2005 | Fukuhara et al. ........... | 382/239 |
| 2006/0236200 A1 | * | 10/2006 | Tanaka et al. ............... | 714/758 |

* cited by examiner

*Primary Examiner*—Amir Alavi
(74) *Attorney, Agent, or Firm*—Kratz, Quntos & Hanson, LLP

(57) ABSTRACT

An image processor includes a JPEG 2000 codec. The JPEG 2000 codec generates a plurality of levels of encoded data, and a checksum circuit integrates the encoded data for each of the levels to determine a checksum. The determined checksum is written together with the encoded data into a header of a stream. In decoding a desired level of the encoded data, a checksum is determined again on the basis of the encoded data and compared with the checksum written in the header. Accordingly, if the two matches with each other, it is concluded that the encoded data is not tampered. If the two does not match with each other, it is concluded that the encoded data is tampered and a warning message is displayed on a monitor.

20 Claims, 8 Drawing Sheets

(A)

(B)

IMAGE PROCESSOR

CROSS REFERENCE OF RELATED APPLICATION

The disclosure of Japanese Patent Application No. 2005-99513 is incorporated herein by reference.

BACKGROUND OF THE INVENTION

1. Field of the Invention

The present invention relates to an image processor. More specifically, the present invention relates to an image processor that is used for surveillance camera equipment and generates encoded data at individual frequency bands based on fetched image data.

2. Description of the Related Art

The image processor performs encoding in JPEG format and then determines a checksum for each frame, and writes the determined checksum into additional data of each frame. Then, in decoding the encoded data, the image processor determines a checksum for each frame, and compares the determined checksum with the checksum written in the additional data. As a result, the image processor concludes that the encoded data is not tampered if the two matches with each other, and concludes that the encoded data is tampered if the two does not match with each other.

However, the related art has a problem in which it is impossible to detect whether the data encoded in JPEG 2000 format is tampered or not for each of the frequency bands.

SUMMARY OF THE INVENTION

Therefore, it is a primary object of the present invention to provide a novel image processor.

It is another object of the present invention to provide an image processor that detects easily whether encoded data with a plurality of frequency bands is tampered or not for each of the frequency bands.

The present invention of claim 1 comprises an encoder (22, 30, S3) for encoding image data corresponding to each of a plurality of different frequency bands, a recorder (22, S15) for recording in a recording medium (36) the encoded image data generated by the encoder, a first calculator (22, 28, S7) for calculating a data amount of the encoded image data recorded by the recorder corresponding to each of the plurality of frequency bands, a second calculator (22, 28, S25, S41, S55) for calculating a data amount of desired encoded image data out of the encoded image data recorded in the recording medium corresponding to each of the plurality of frequency bands, a comparator (22, S31, S47, S61) for comparing second numeric information indicative of the data amount of the data calculated by the second calculator with first numeric information indicative of the data amount calculated by the first calculator with respect to the desired encoded image data, and an output (22, S35, S51, S65) for outputting a message in accordance with result of the comparison by the comparator.

In the present invention of claim 1, the encoder generates encoded image data from image data corresponding to each of a plurality of different frequency bands, and the recorder records the generated encoded image data in the recording medium. At that time, the first calculator calculates an amount of the encoded image data corresponding to each of the plurality of frequency bands. After that, the second calculator calculates a data amount of desired encoded image data out of the encoded image data recorded in the recording medium, corresponding to each of the plurality of frequency bands.

Then, the comparator compares second numeric information indicative of the data amount calculated by the second calculator with first numeric information indicative of the data amount calculated by the first calculator, and the output outputs a message in accordance with the result of the comparison by the comparator.

Consequently, in the comparison of the second numeric information and the first numeric information, if the two matches with each other, it is concluded that the desired encoded image data is not tampered. If the two do not match with each other, it is concluded that the recorded encoded image data is tampered. In this manner, it is possible to detect easily whether the encoded image data is tampered or not for each of the plurality of frequency bands.

The present invention of claim 2 is an image processor depending on claim 1, further comprising a decoder (22, 30, S29, S45, S59) for decoding the desired encoded image data, and a display (22, 40, S33, S35, S49, S51, S63, S65) for displaying an image based on the image data decoded by the decoder, wherein the output (22, S35, S51, S65) outputs the message in relation to a displaying operation of the display.

In the present invention of claim 2, the decoder decodes desired encoded image data, and the display displays an image based on the decoded image data. At that time, the output outputs a message in association with the display's operation of displaying the image. In this case, the image of the decoded image data is displayed together with a message indicating whether the encoded data is tampered or not.

The present invention of claim 3 is an image processor according to claim 2, further comprising a selector (22, S23, S39, S53) for selecting one of the plurality of frequency bands, wherein the decoder decodes encoded image data components belonging to the frequency band selected by the selector, and the comparator performs a comparison focusing on the frequency band selected by the selector.

In the present invention of claim 3, the selector selects one of the plurality of frequency bands. After the second numeric information of encoded image data components with the selected frequency band is compared with the first numeric information of encoded image data components with the same frequency bands, the decoder decodes the encoded image data components. In this case, it is possible to decode encoded image data components with an arbitrary frequency band selected by the selector after it is detected whether the encoded image data is tampered or not.

The present invention of claim 4 is an image processor according to any one of claims 1 to 3, further comprising an assigner (22, S9) for assigning the first numeric information to the encoded image data recorded by the recorder, and a detector (22, 28, S31, S47, S61) for detecting the first numeric information assigned to the desired encoded image data prior to the comparison by the comparator.

In the present invention of claim 4, the assigner assigns the first numeric information to the encoded image data recorded by the recorder. The detector detects the assigned first numeric information prior to the comparison by the comparator. In this case, the first numeric information is detected prior to the comparison. Thus, by comparing the detected first numeric information with the second numeric information, it is possible to detect easily whether the encoded image data is tampered or not.

The present invention of claim 5 is an image processor according to any one of claims 1 to 4, wherein an encoding format of the encoder conforms to a wavelet transformation format. In this case, it is possible to generate encoded image data from the image data corresponding to each of a plurality of different frequency bands.

The present invention of claim 6 is an image processor according to any one of claims 1 to 5, further comprising a photographer (18, 22, S1) for photographing an object scene, wherein the image data to be encoded by the encoder depicts an image of the object scene photographed by the photographer. In this case, it is possible to detect easily whether the encoded image data of the object scene photographed by the photographer is tampered or not.

According to the present invention, by comparing the second numeric information calculated for each of frequency bands with the first numeric information, it is possible to detect easily the encoded image data is tampered or not for each of the plurality of frequency bands.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
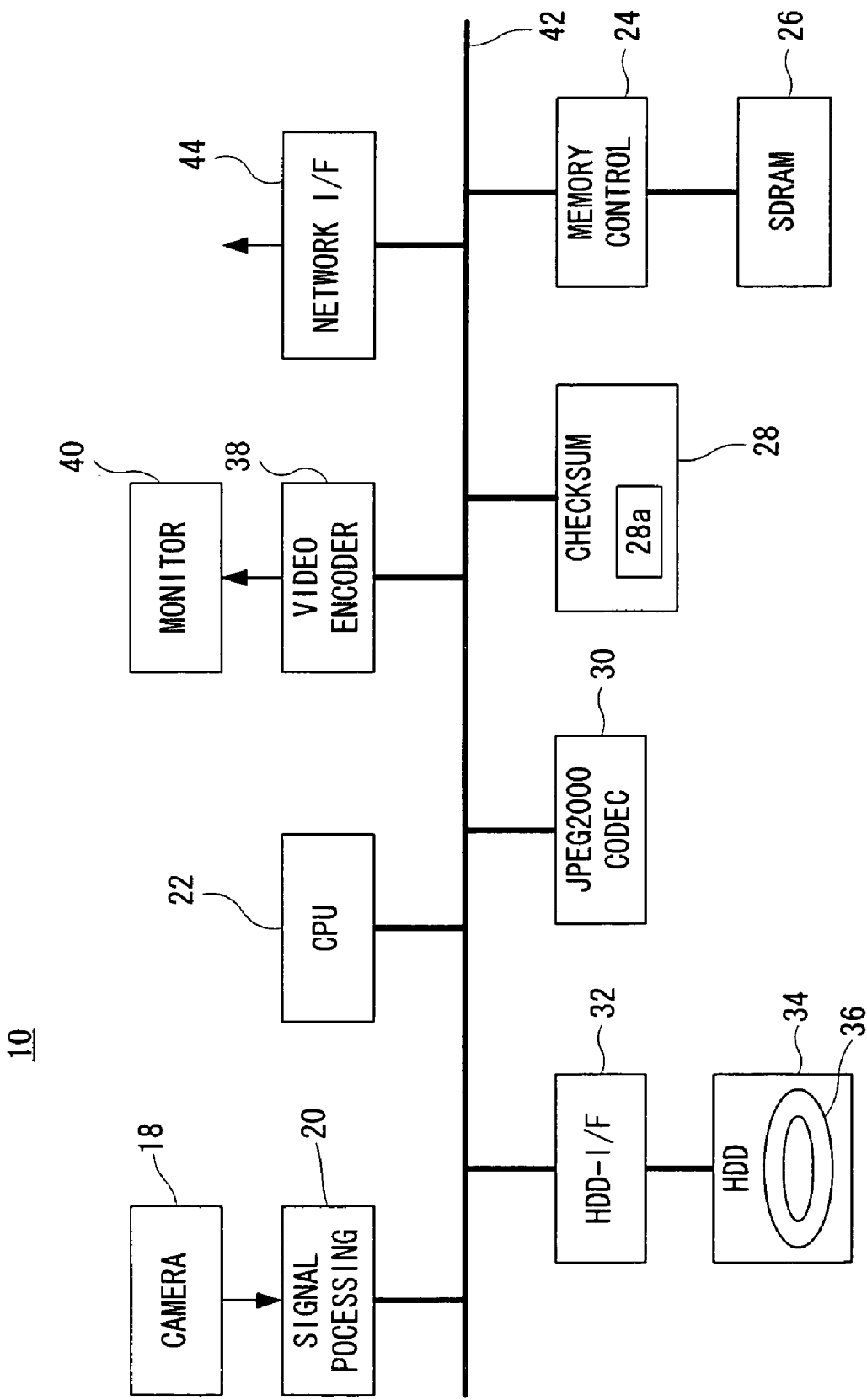
FIG. 1 is a block diagram showing surveillance camera equipment as one embodiment of the present invention.

Referring to FIG. 1, a detailed description will be given as to structure of surveillance camera equipment 10 of this embodiment. The surveillance camera equipment 10 includes a camera 18. The camera 18 photographs an object scene under a photographing instruction provided by a CPU 22, and outputs an image signal of the photographed object scene to a signal processing circuit 20. The signal processing circuit 20 fetches the provided image signal and converts the fetched image signal into image data as a digital signal. Next, the signal processing circuit 20 subjects the converted image data to color separation, white balance adjustment, YUV conversion and the like, and outputs image data together with a write request to a memory control circuit 24. In response to the write request, the memory control circuit 24 writes the provided image data into an SDRAM 26.

The CPU 22 provides the JPEG 2000 codec 30 with a level encoding process instruction to encode image data corresponding to each of a plurality of levels (frequency bands) at each photographing cycle. The JPEG 200 codec 30 outputs a read request to the memory control circuit 24 in accordance with the level encoding process instruction. In response to the read request, the memory control circuit 24 reads the image data written in the SDRAM 26, and provides the read image data to the JPEG 2000 codec 30.

The JPEG 2000 codec 30 generates encoded data from the provided image data for each of the levels in JPEG 2000 format. The JPEG 2000 codec 30 further forms a stream described later by using each of the levels of generated encoded data, and provides the formed steam to a checksum circuit 28. The checksum circuit 28 integrates the encoded data constituting the provided stream to determine a checksum for each of the level, and writes the determined checksum into a header of the stream. The checksum circuit 28 provides the JPEG 2000 codec 30 with the stream in which the checksum is written. The JPEG 2000 codec 30 outputs the stream together with a write request to the memory control circuit 24, and the memory control circuit 24 writes the provided stream into the SDRAM 26 in response to the write request.

Upon completion of the level encoding process, the CPU 22 provides with an HDD-1/F32 with an instruction to record the stream in a hard disk 36. According to the recording instruction, the HDD-1/F32 outputs a stream read request to the memory control circuit 24. The memory control circuit 24 reads the stream from the SDRAM 26 in response to the read request, and outputs the read stream to the HDD-1/F32 via a bus 42. The HDD-1/F32 records the provided stream in the hard disk 36 via an HDD 34.

Then, a description will be given as to the case of decoding the stream recorded in the hard disk 36. The CPU 22 instructs the HDD-1/F32 to read the stream recorded in the hard disk 36. The HDD-1/F32 reads the stream recorded in the hard disk 36 via the HDD 34, and outputs the read stream together with a write request to the memory control circuit 24. In response to the write request, the memory control circuit 24 writes the provided steam into the SDRAM 26.

When a desired level of encoded data to be decoded is selected, out of the encoded data forming the stream, the CPU 22 provides the JPEG 2000 codec 30 with a decoding instruction to decode the encoded data at each decoding cycle. The JPEG 2000 codec 30 outputs a read request to the memory control circuit 24 according to the decoding instruction. The memory control circuit 24 reads the selected level of encoded data from the stream written in the SDRAM 26 in response to the read request. The read encoded data is given via the bus 42 to the JPEG 2000 codec 30. The JPEG 2000 codec 30 provides the given encoded data to the checksum circuit 28. The checksum circuit 28 integrates the provided encoded data to determine a checksum, and writes the determined checksum into a buffer memory 28a provided in the checksum circuit 28.

When the checksum circuit 28 has determined the checksum, the encoded data is provided again to the JPEG 2000 codec 30. The JPEG 2000 codec 30 decodes the provided encoded data in JPEG 2000 format to generate image data, and requests the memory control circuit 24 to write the generated image data. In response to the request, the memory control circuit 24 writes the generated image data into the SDRAM 26.

Then, the CPU 22 provides a video encoder 38 with a decoding instruction to decode a designated level of encoded data. The video encoder 38 outputs a read request to the memory control circuit 24 in accordance with the decoding instruction. The memory control circuit 24 reads the image data written in the SDRAM 26 in response to the read request, and outputs the read image data to the video encoder 38.

At that time, the CPU 22 compares the checksum written in the header of the stream with the checksum written in the buffer memory 28a to determine whether the two checksums match with each other or not, and provides result of the determination to the video encoder 38. The video encoder 38 converts the provided image data into a composite image signal, outputs the converted composite image signal to the monitor 40, and if it is concluded that the two checksums do not match with each other, outputs a warning message to the monitor 40.

Figure 2:
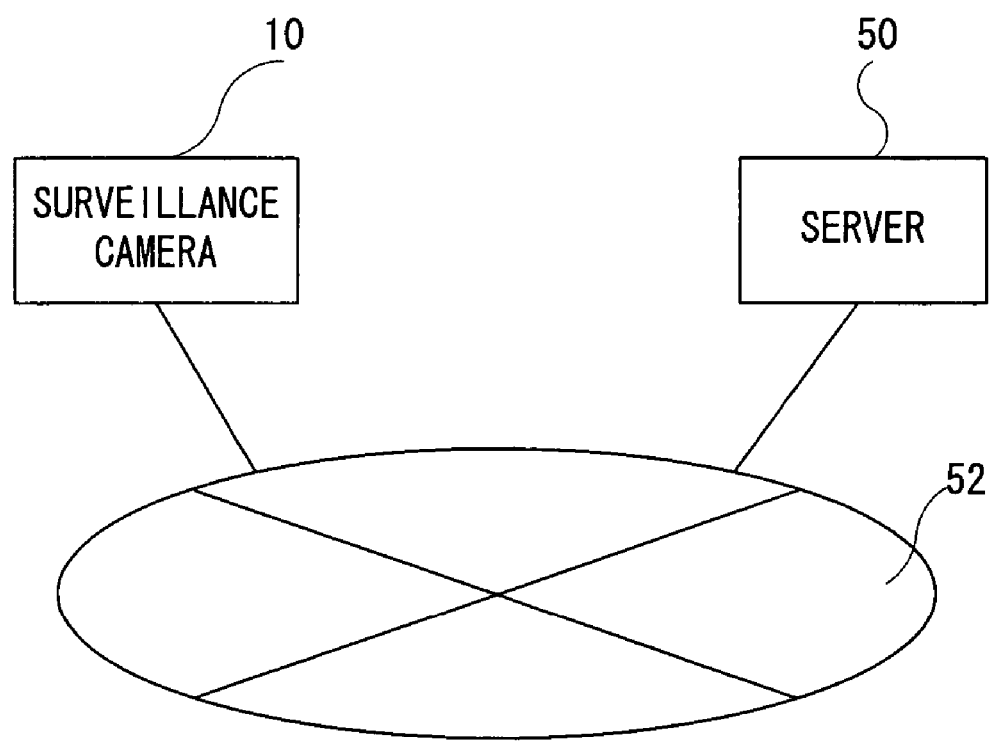
FIG. 2 is a block diagram with surveillance camera equipment connected to the Internet network.

Besides, the surveillance camera equipment 10 may be connected to a server 50 via the internet network 52 as shown in FIG. 2. In this case, the surveillance camera equipment 10 not only decodes the stream recorded in the hard disk 36 as described above but also transmits it to the server 50 via the Internet network 52. The CPU 22 provides a network I/F 44 with a transmission instruction to transmit the stream. The network I/F 44 outputs a request for reading the stream to the memory control circuit 24 in accordance with the transmission instruction. The memory control circuit 24 reads the stream from the SDRAM 26 in response to the read request, and outputs the read stream to the network I/F 44 via the bus 42. The network I/F 44 transmits the provided stream to the server 50 via the Internet network 52.

Upon reception of the transmitted stream, the server 50 determines a checksum of the selected level of encoded data out of the different levels of encoded data constituting the stream, as in the case with the surveillance camera equipment 10. Based on the determined checksum, the server 50 detects whether the transmitted encoded data is tampered or not.

Next, a detailed description will be provided here as to an encoding process and a decoding process by the JPEG 2000 codec 30. The JPEG 2000 codec 30 encodes image data according to the procedure described below. Firstly, the JPEG 2000 codec 30 performs wavelet transformation on the image data. This allows the image data to be subjected to sub-band decomposition a predetermined number of times in horizontal and vertical directions.

Figure 3:
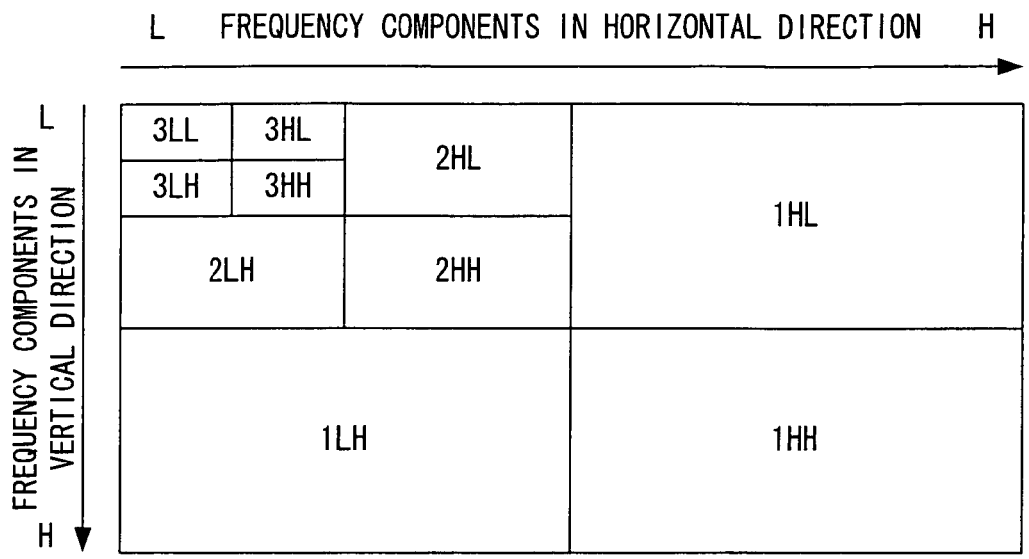
FIG. 3 is an illustrative view showing one example of wavelet conversion.

With reference to FIG. 3, one example of wavelet transformation will be described below. For example, if the number of times of sub-band decomposition, i.e. the value of decomposition level is three, an original image (0LL) is firstly decomposed into four sub-bands (1LL, 1HL, 1LH and 1LL) based on frequency components in a horizontal direction and frequency components in a vertical direction. Similarly, the 1LL sub-band is decomposed into four sub-bands (2LL, 2HL, 2LH and 2LL), and the 2LL sub-band is further decomposed into four sub-bands (3LL, 3HL, 3LH and 3HH). As a consequence, the original image is decomposed into the total ten sub-bands 3LL, 3HL, 3LH, 3HH, 2HL, 2LH, 2HH, 1HL, 1LH and 1HH.

Figure 4:
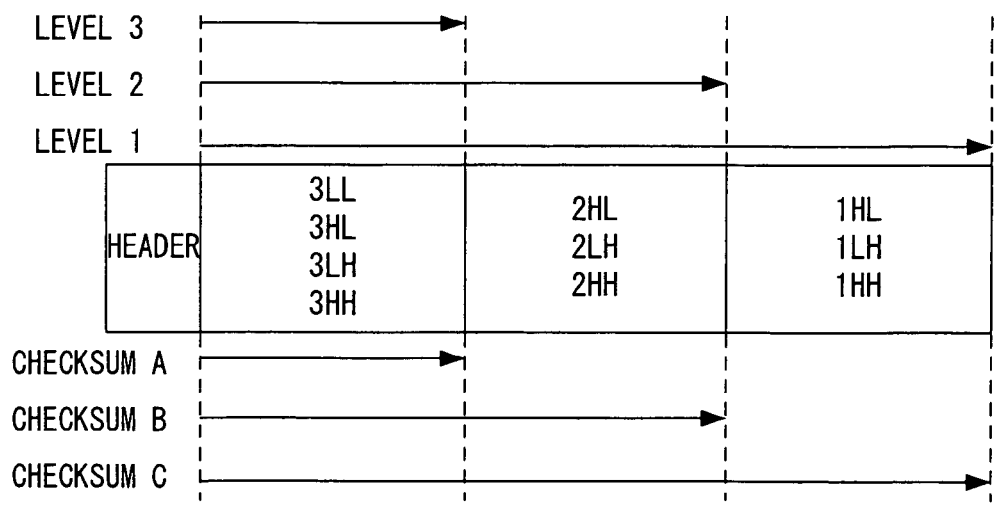
FIG. 4 is an illustrative view showing data structure of a stream.

Referring to FIG. 4, a stream formed by the JPEG 2000 codec 30 will be described below. The stream includes a header and three areas for storing encoded data. Written into the header are encoding parameters and quantization parameters, etc. in addition to a checksum described below. The three areas stores four sub-bands 3LL, 3HL, 3LH and 3HH, and three sub-bands 2HL, 2LH and 2HH, and three sub-bands 1HL, 1LH and 1HH, respectively.

In this embodiment, the encoded data composed of the four sub-bands 3LL, 3HL, 3LH and 3HH is called encoded data of level 3, the encoded data composed of the seven sub-bands 3LL, 3HL, 3LH, 3HH, 2HL, 2LH and 2HH is called encoded data of level 2, and the encoded data composed of the ten sub-bands 3LL, 3HL, 3LH, 3HH, 2HL, 2LH, 2HH, 1HL, 1LH and 1HH is referred to encoded data of level 1.

The original image is formed by these encoded data of levels 1 to 3. In this case, an image with minimum degree of resolution is decoded by the encoded data of level 3. With the addition of the three sub-bands 2HL, 2LH and 2HH, the encoded data of level 3 is turned into the encoded data of level 2, resulting in an increase in the resolution of the image to be decoded. Moreover, by adding the three sub-bands 1HL, 1LH and 1HH, the encoded data of level 2 becomes the encoded data of level 1, which will further raise the resolution of the image to be decoded.

Provided with the stream from the JPEG 2000 codec 30, the checksum circuit 28 integrates 8-bit data values forming the different levels of encoded data constituting the stream to determine 16-bit checksums. A checksum A is an integrated value of the encoded data of level 3, a checksum B is an integrated value of the encoded data of level 2, and a checksum C is an integrated value of the encoded data of level 1. After the encoding, the checksum circuit 28 determines the checksums A to C and writes them into the header. The checksum circuit 28 also determines a selected one of the checksums A to C, and writes the determined checksum into the buffer memory 28a.

The CPU 22 of the surveillance camera equipment 10 reads the selected encoded data in decoding the stream recorded in the hard disk 36. Then, the checksum circuit 28 determines a checksum by integrating data values of the read encoded data, writes the determined checksum into the buffer memory 28a, and then decodes the encoded data. The CPU 22 then reads the checksum written at encoding time, and compares the read checksum with the checksum written in the buffer memory 28a. Accordingly, if these two checksums match with each other, the CPU 22 concludes that the encoded data is not tampered, and displays only the read image on the monitor 40 as shown in FIG. 5 (A).

Figure 5:
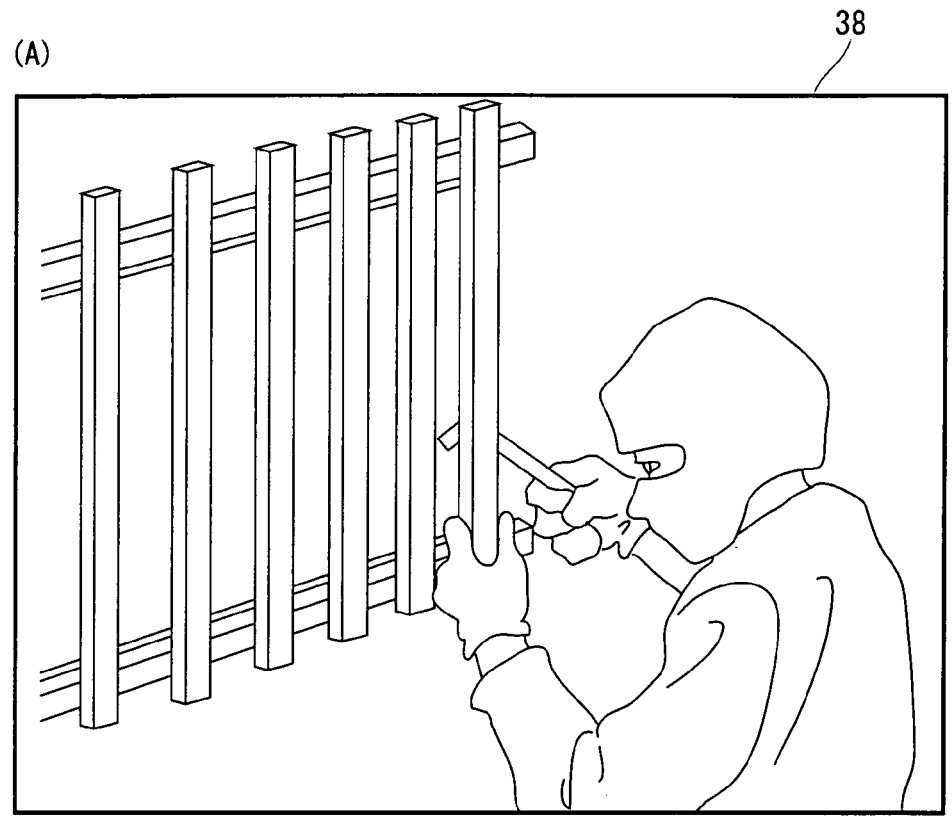
FIG. 5 is an illustrative view showing a display image of a monitor.
Figure 5:
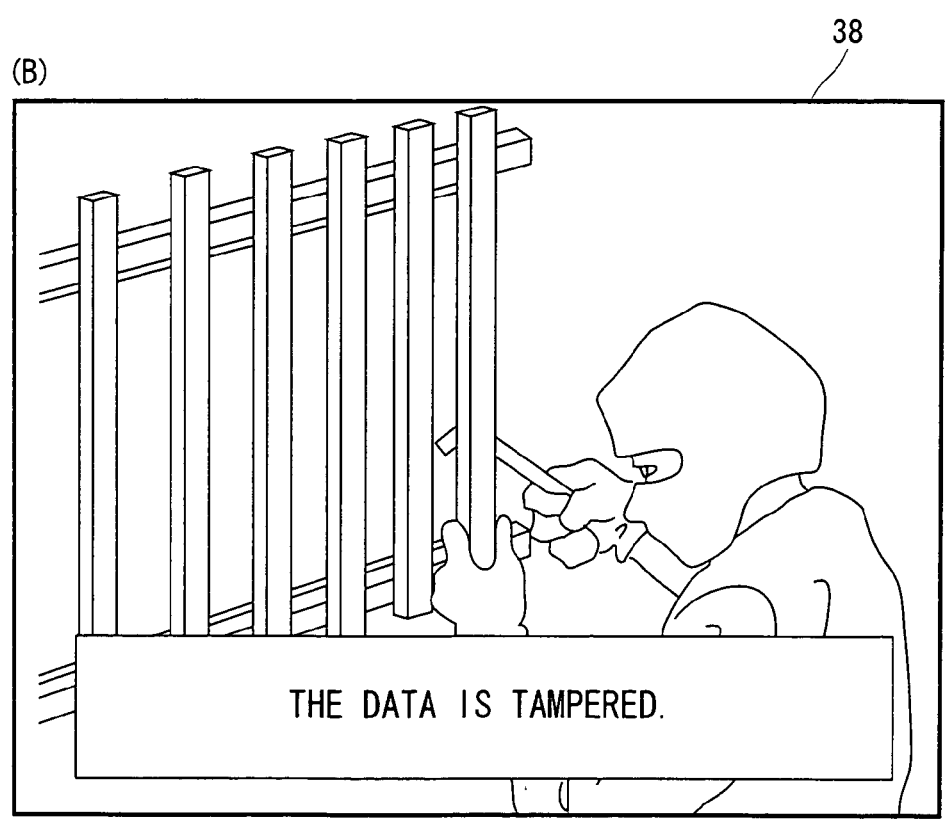

On the other hand, if the two checksums do not match with each other, the CPU 22 concludes that the encoded data is tampered, and displays the read image on the monitor 40, and also provides a warning message "The data is tampered." in a superimposed manner, as shown in FIG. 5 (B).

Figure 6:
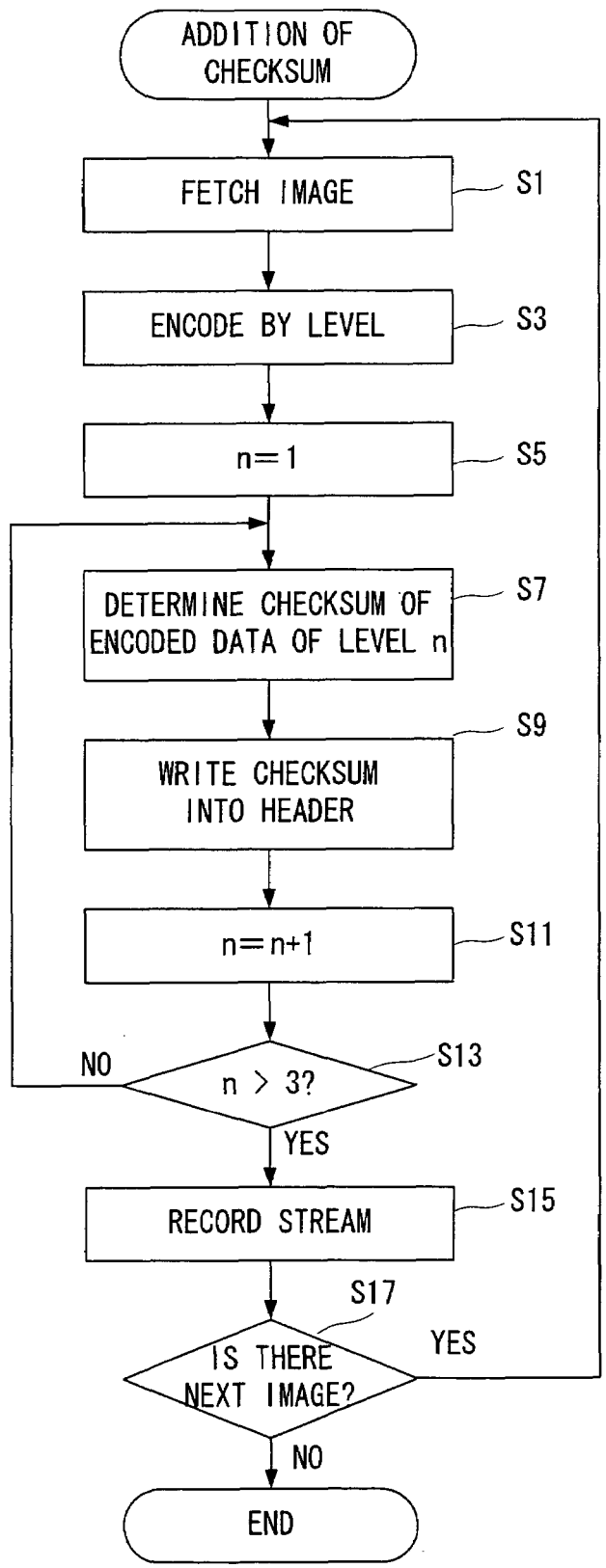
FIG. 6 is a flow chart showing a part of operation of FIG. 1 embodiment.

The CPU 22 adds a checksum to the image data fetched in accordance with a flow chart shown in FIG. 6. In a step S1, firstly, the CPU 22 fetches an image signal of an object scene photographed by the camera 18. In a step S3, the CPU 22 allows the JPEG 2000 codec 30 to encode the fetched image data for each of the levels in accordance with the JPEG 2000 format. As a result, encoded data of three levels are generated, and a stream is formed from the generated encoded data of three levels.

In a step S5, a value of a variable n is assumed to be 1. In a step S7, the CPU 22 makes the checksum circuit 28 determine a checksum through integration of encoded data of level n. In a step S9, the CPU 22 writes the determined checksum into the header of the stream. The CPU 22 increments the value of the variable n in a step S11 and determines in a step S13 whether the incremented value of the variable n is larger than 3 or not. The determination is here based on the number 3 because the decomposition level is 3 in this embodiment and thus the value of the variable n will never exceed 3. The CPU 22 returns to the step S7 if NO or proceeds to a step S15 if YES.

In the step S15, the CPU 22 records the stream in the hard disk 36. In the step S17, the CPU 22 determines whether there exists a next image yet to be fetched or not. The CPU 22 returns to the step S1 if YES or terminates the process if NO.

Figure 7:
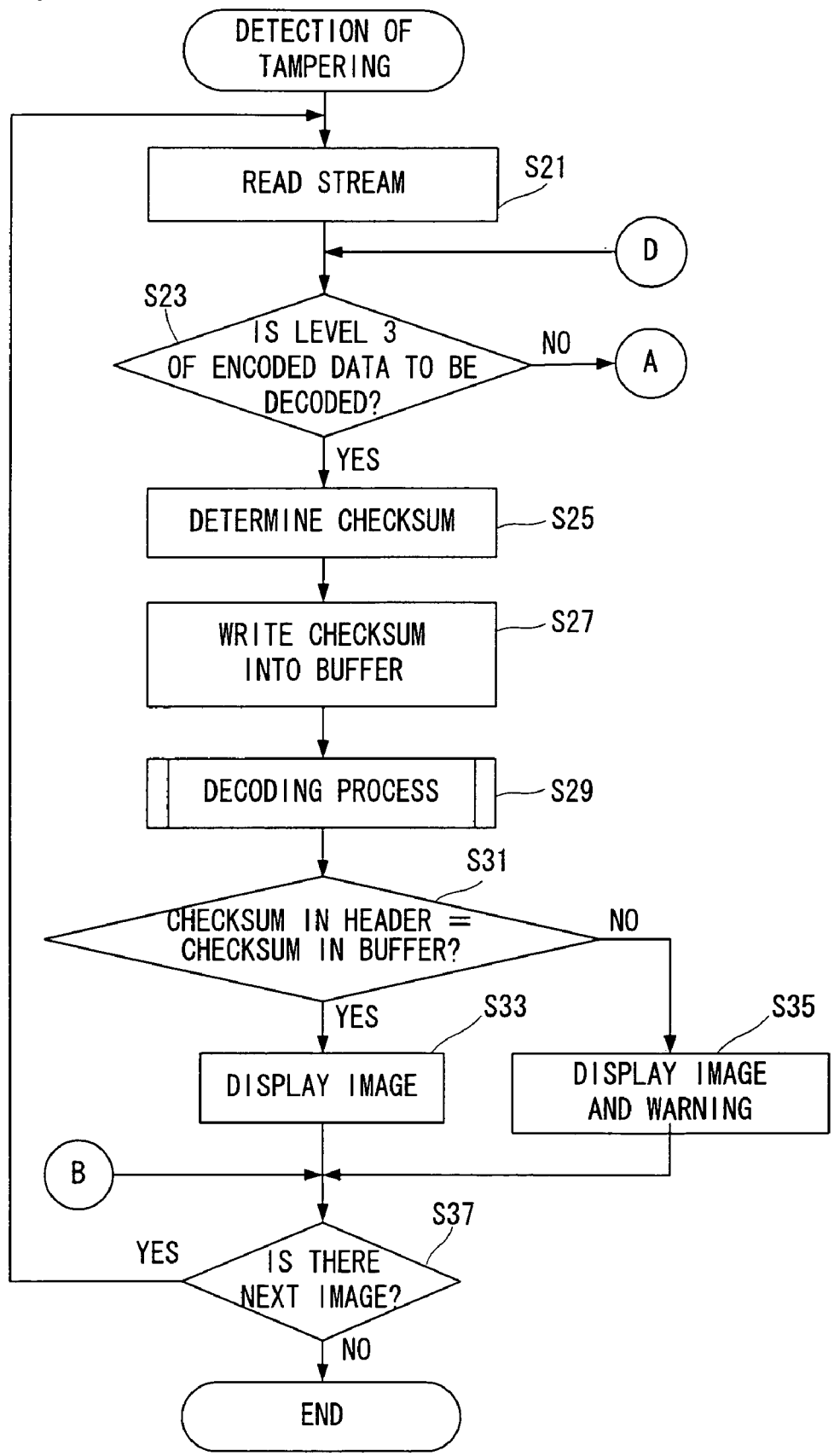
FIG. 7 is a flow chart showing another part of operation of FIG. 1 embodiment.
Figure 8:
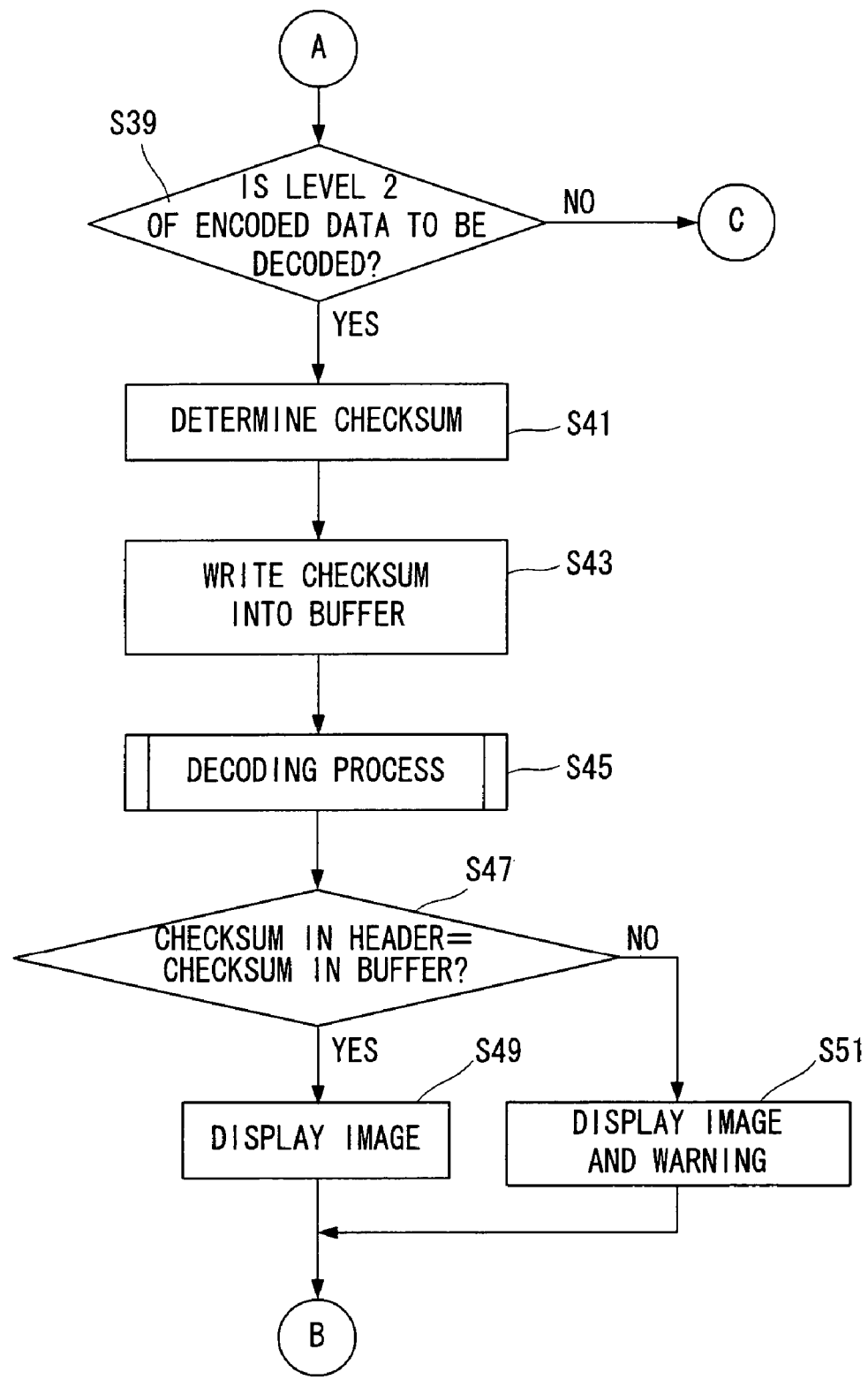
FIG. 8 is a flow chart showing still another part of operation of FIG. 1 embodiment.
Figure 9:
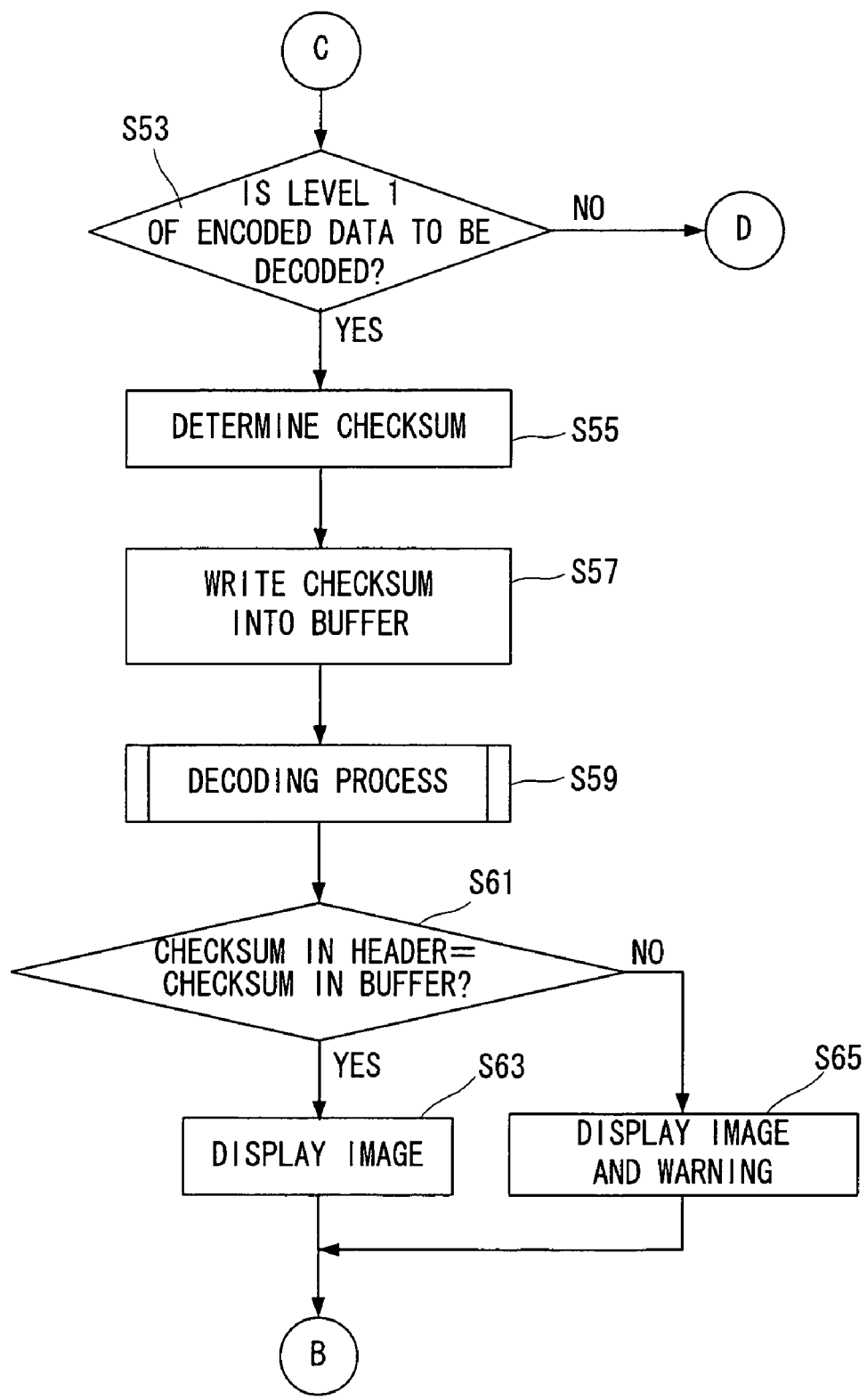
FIG. 9 is a flow chart showing further another part of operation of FIG. 1 embodiment.

The CPU 22 also performs a tampering detection process on the encoded data recorded in the hard disk 36 according to the flow charts shown in FIGS. 7 to 9. In a step S21, the CPU 22 reads a stream from the hard disk 36. In a step S23, the CPU 22 determines whether or not to decode the encoded data of level 3 for the read stream. If it has concluded to be YES, the CPU 22 integrates the data values of the encoded data of level 3 to determine a checksum. In a step S27, the CPU 22 writes the determined checksum into the buffer memory 28a. In a step S29, the CPU 22 decodes the encoded data of level 3. In a step S31, the CPU 22 reads the checksum written in the header and the checksum written in the buffer memory 28a, and determines whether the two matches with each other or not. If the result is YES, the CPU 22 displays an image on the monitor 40 in a step S33, and then proceeds to a step S37. On the other hand, if NO, the CPU 22 displays the image and a warning message "The data is tampered." in a step S35, and then moves to the step S37. In the step S37, the CPU 22 determines whether there exists a next image yet to be received or not. The CPU 22 returns to the step S21 if YES or terminates the process if NO.

If it has concluded the result to be NO in the step S23, the CPU 22 determines whether or not to decode the encoded data of level 2 in a step S39. If the result is YES, the CPU 22 integrates the data values of the encoded data of level 2 to determine a checksum in a step S41. In a step S43, the CPU 22 writes the determined checksum into the buffer memory 28a. In a step S45, the CPU 22 decodes the encoded data of level 2. In a step S47, the CPU 22 reads the checksum written in the header and the checksum written in the buffer memory 28a, and determines whether the two matches with each other or not. If the result is YES, the CPU 22 displays the image on the monitor 40 in a step S49 and then proceeds to the above mentioned step S37. On the other hand, if NO, the CPU 22 displays the image and the warning message "The data is tampered.", and then moves to the above mentioned step S37.

If NO in the step S39, the CPU 22 determines in a step S53 whether or not to decode the encoded data of level 1. If it has concluded the result to be NO, the CPU 22 returns to the step S23. If YES, the CPU 22 integrates the data values of the encoded data of level 1 to determine a checksum in a step S55. In a step S57, the CPU 22 writes the determined checksum into the buffer memory 28a. In a step S59, the CPU 22 decodes the encoded data of level 1. In a step S61, the CPU 22 reads the checksum written in the header and the checksum written in the buffer memory 28a, and determines whether the two matches with each other or not. If YES, the CPU 22 displays the image on the monitor 40 in a step S63, and then proceeds to the aforementioned step S37. On the other hand, if NO, the CPU 22 displays the image and the warning message "The data is tampered." in a step S65, and then moves to the above mentioned step S37.

As understood from the above description, the JPEG 2000 codec 30 encodes an image photographed by the camera 18, resulting in the data encoded for each of the levels. Then, the checksum circuit 28 integrates the encoded data for each of the levels to determine a checksum. The CPU 22 writes the determined checksum into the header of a stream formed by the encoded data. The CPU 22 records in the hard disk 36 the stream to which the checksum is written.

Then, the CPU 22 reads a desired level of encoded data from the stream recorded in the hard disk 36, and integrates the read encoded data to determine a checksum. Next, the CPU 22 compares the determined checksum with the checksum written in the header.

If the two checksums match with each other, the CPU 22 concludes that the encoded data is not tampered. On the other hand, if they do not match with each other, the CPU 22 concludes that the encoded data is tampered, and displays the warning message on the monitor 40. As stated above, since the checksum written in the header for each of the levels is compared with the checksum of a desired level of encoded data, it is possible to detect whether the encoded data is tampered or not for each of the levels.

In the above described embodiment, the warning message indicating the encoded data is tampered is displayed on the monitor. Alternatively, the warning may be sounded from a speaker.

Also, in the aforesaid embodiment, the warning message indicating that the encoded data is tampered is displayed on the monitor, together with the tampered image. As an alternative, only the warning message indicative of the tampering may be displayed on the monitor.

Furthermore, a description was given as to the case in which a checksum is used as data for detection of tampered encoded data in relation to the above mentioned embodiment. Alternatively, parity and CRC (Cyclic Redundancy Check) may be used instead of checksum for that purpose.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processor comprising:
   an encoder for encoding image data corresponding to each of a plurality of different frequency bands;
   a recorder for recording in a recording medium the encoded image data generated by said encoder;
   a first calculator for calculating a data amount of the encoded image data recorded by said recorder corresponding to each of said plurality of frequency bands;
   a second calculator for calculating a data amount of desired encoded image data out of the encoded image data recorded in said recording medium corresponding to each of said plurality of frequency bands;
   a comparator for comparing second numeric information indicative of the data amount of the data calculated by said second calculator with first numeric information indicative of the data amount calculated by said first calculator with respect to said desired encoded image data; and
   an output for outputting a message in accordance with result of the comparison by said comparator.

2. An image processor depending on claim 1, further comprising:
   a decoder for decoding said desired encoded image data; and
   a display for displaying an image based on the image data decoded by said decoder, wherein said output outputs said message in relation to a displaying operation of said display.

3. An image processor according to claim 2, further comprising a selector for selecting one of said plurality of frequency bands, wherein said decoder decodes encoded image data components belonging to the frequency band selected by said selector, and said comparator performs a comparison focusing on the frequency band selected by said selector.

4. An image processor according to claim 3, further comprising:
   an assigner for assigning said first numeric information to the encoded image data recorded by said recorder; and
   a detector for detecting the first numeric information assigned to said desired encoded image data prior to the comparison by said comparator.

5. An image processor according to claim 4, wherein an encoding format of said encoder conforms to a wavelet transformation format.

6. An image processor according to claim 4, further comprising a photographer for photographing an object scene, wherein said image data to be encoded by the encoder depicts an image of the object scene photographed by the photographer.

7. An image processor according to claim 3, wherein an encoding format of said encoder conforms to a wavelet transformation format.

8. An image processor according to claim 3, further comprising a photographer for photographing an object scene, wherein said image data to be encoded by the encoder depicts an image of the object scene photographed by the photographer.

9. An image processor according to claim 2, further comprising:
  an assigner for assigning said first numeric information to the encoded image data recorded by said recorder; and
  a detector for detecting the first numeric information assigned to said desired encoded image data prior to the comparison by said comparator.

10. An image processor according to claim 9, wherein an encoding format of said encoder conforms to a wavelet transformation format.

11. An image processor according to claim 9, further comprising a photographer for photographing an object scene, wherein said image data to be encoded by the encoder depicts an image of the object scene photographed by the photographer.

12. An image processor according to claim 2, wherein an encoding format of said encoder conforms to a wavelet transformation format.

13. An image processor according to claim 2, further comprising a photographer for photographing an object scene, wherein said image data to be encoded by the encoder depicts an image of the object scene photographed by the photographer.

14. An image processor according to claim 1, further comprising:
  an assigner for assigning said first numeric information to the encoded image data recorded by said recorder; and
  a detector for detecting the first numeric information assigned to said desired encoded image data prior to the comparison by said comparator.

15. An image processor according to claim 14, wherein an encoding format of said encoder conforms to a wavelet transformation format.

16. An image processor according to claim 14, further comprising a photographer for photographing an object scene, wherein said image data to be encoded by the encoder depicts an image of the object scene photographed by the photographer.

17. An image processor according to claim 1, wherein an encoding format of said encoder conforms to a wavelet transformation format.

18. An image processor according to claim 17, further comprising a photographer for photographing an object scene, wherein said image data to be encoded by the encoder depicts an image of the object scene photographed by the photographer.

19. An image processor according to claim 1, further comprising a photographer for photographing an object scene, wherein said image data to be encoded by the encoder depicts an image of the object scene photographed by the photographer.

20. An image processing method comprising following steps of:
  an encoding step of encoding image data corresponding to each of a plurality of different frequency bands;
  a recording step of recording in a recording medium the encoded image data generated in said encoding step;
  a first calculation step of calculating a data amount of the encoded image data recorded in said recording step corresponding to each of said plurality of frequency bands;
  a second calculation step of calculating a data amount of desired encoded image data out of the encoded image data recorded in said recoding medium corresponding to each of said plurality of frequency bands;
  a comparison step of comparing second numeric information indicative of the data amount of the desired encoded image data calculated in said second calculation step with first numeric information indicative of the data amount calculated in said first calculation step with respect to said desired encoded image data; and
  an output step of outputting a message according to result of the comparison by said comparator.

* * * * *